(12) United States Patent
Cowen et al.

(10) Patent No.: US 8,520,996 B2
(45) Date of Patent: Aug. 27, 2013

(54) REMOVABLY MOUNTABLE FIBER OPTIC TERMINAL

(75) Inventors: Andrew P. Cowen, Keller, TX (US);
Marcel G. Mures, Fort Worth, TX (US);
Karyne P. Prevratil, Watauga, TX (US);
Joseph A. Weeks, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 430 days.

(21) Appl. No.: 12/751,860

(22) Filed: Mar. 31, 2010

(65) Prior Publication Data

US 2010/0247053 A1 Sep. 30, 2010

Related U.S. Application Data

(60) Provisional application No. 61/165,272, filed on Mar. 31, 2009.

(51) Int. Cl.
*G02B 6/00* (2006.01)
(52) U.S. Cl.
USPC ........................................................ 385/135
(58) Field of Classification Search
USPC ........................................................ 385/135
See application file for complete search history.

(56) References Cited

U.S. PATENT DOCUMENTS

| | | | |
|---|---|---|---|
| 1,280,393 | A | 10/1918 | Cannon |
| 1,703,255 | A | 2/1929 | Wagner |
| 2,003,147 | A | 5/1935 | Holm-Hansen |
| 2,044,073 | A | 6/1936 | Hurley |
| 2,428,149 | A | 9/1947 | Falk |
| 2,984,488 | A | 5/1961 | Kirchner |
| 3,054,994 | A | 9/1962 | Haram |

(Continued)

FOREIGN PATENT DOCUMENTS

| | | |
|---|---|---|
| DE | 4130706 A1 | 3/1993 |
| DE | 4133375 C1 | 4/1993 |

(Continued)

OTHER PUBLICATIONS

Notice of Allowance for U.S. Appl. No. 11/595,723 mailed Dec. 28, 2010, 8 pages.

(Continued)

*Primary Examiner* — Omar Rojas (57) ABSTRACT

A zero-U, high-density fiber optic terminal for data centers and central offices is disclosed. The terminal may be used for optical fiber interconnection and/or optical fiber and fiber optic cable storage. The terminal is removably mountable to a cable tray above fiber optic equipment, in a subfloor below fiber optic equipment or on a wall in proximity of fiber optic equipment. Additionally, the terminal may have an adapter panel with fiber optic adapters for optically connecting the optical fiber of a first fiber optic cable received from the cable tray and the optical fiber of a second fiber optic cable. The second fiber optic cable is intended to extend to the fiber optic equipment. The adapter panel and the fiber optic adapters are angled generally in the direction in which the second fiber optic cable is intended to extend. Angling the fiber optic adapters in this manner accommodates routing of second fiber optic cable, and provides ease of access to the fiber optic adapters for connecting and disconnecting fiber optic connectors and to slack storage components for cable management mounted in the terminal.

13 Claims, 5 Drawing Sheets

(56) References Cited

U.S. PATENT DOCUMENTS

| | | |
|---|---|---|
| 3,204,867 A | 9/1965 | Wahlbom |
| 3,880,390 A | 4/1975 | Niven |
| 4,006,540 A | 2/1977 | Lemelson |
| 4,012,010 A | 3/1977 | Friedman |
| 4,073,560 A | 2/1978 | Anhalt et al. |
| 4,123,012 A | 10/1978 | Hough |
| 4,177,961 A | 12/1979 | Gruenewald |
| 4,210,380 A | 7/1980 | Brzostek |
| D257,613 S | 12/1980 | Gruenewald |
| 4,244,544 A | 1/1981 | Kornat |
| 4,261,529 A | 4/1981 | Sandberg et al. |
| 4,261,644 A | 4/1981 | Giannaris |
| 4,480,449 A | 11/1984 | Getz et al. |
| 4,497,457 A | 2/1985 | Harvey |
| 4,502,754 A | 3/1985 | Kawa |
| 4,506,698 A | 3/1985 | Garcia et al. |
| 4,524,384 A | 6/1985 | Lefkowitz et al. |
| D281,574 S | 12/1985 | O'Hara, II |
| 4,579,310 A | 4/1986 | Wells et al. |
| 4,586,675 A | 5/1986 | Brown |
| 4,611,887 A | 9/1986 | Glover et al. |
| 4,736,100 A | 4/1988 | Vastagh |
| 4,747,020 A | 5/1988 | Brickley et al. |
| 4,778,125 A | 10/1988 | Hu |
| 4,806,814 A | 2/1989 | Nold |
| 4,810,054 A | 3/1989 | Shinbori et al. |
| 4,824,193 A | 4/1989 | Maeda et al. |
| 4,836,479 A | 6/1989 | Adams |
| 4,844,573 A | 7/1989 | Gillham et al. |
| 4,884,863 A | 12/1989 | Throckmorton |
| 4,900,118 A | 2/1990 | Yanagawa et al. |
| 4,900,123 A | 2/1990 | Barlow et al. |
| 4,948,220 A | 8/1990 | Violo et al. |
| 4,961,623 A | 10/1990 | Midkiff et al. |
| 4,979,749 A | 12/1990 | Onanian |
| 4,995,688 A | 2/1991 | Anton et al. |
| 5,023,646 A | 6/1991 | Ishida et al. |
| 5,048,916 A | 9/1991 | Caron |
| 5,048,926 A | 9/1991 | Tanimoto |
| 5,066,149 A | 11/1991 | Wheeler et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,085,384 A | 2/1992 | Kasubke |
| 5,112,014 A | 5/1992 | Nichols |
| D327,312 S | 6/1992 | Myojo |
| 5,142,598 A | 8/1992 | Tabone |
| D330,368 S | 10/1992 | Bourgeois et al. |
| 5,189,410 A | 2/1993 | Kosugi et al. |
| 5,204,929 A | 4/1993 | Machall et al. |
| 5,209,441 A | 5/1993 | Satoh |
| 5,214,735 A | 5/1993 | Henneberger et al. |
| 5,218,664 A | 6/1993 | O'Neill et al. |
| 5,231,687 A | 7/1993 | Handley |
| 5,233,674 A | 8/1993 | Vladic |
| 5,243,679 A | 9/1993 | Sharrow et al. |
| 5,255,161 A | 10/1993 | Knoll et al. |
| 5,260,957 A | 11/1993 | Hakimi et al. |
| 5,265,187 A | 11/1993 | Morin et al. |
| 5,271,585 A | 12/1993 | Zetena, Jr. ............... 248/49 |
| 5,274,731 A | 12/1993 | White |
| 5,287,428 A | 2/1994 | Shibata |
| 5,317,663 A | 5/1994 | Beard et al. |
| 5,323,480 A | 6/1994 | Mullaney et al. |
| 5,333,221 A | 7/1994 | Briggs et al. |
| 5,333,222 A | 7/1994 | Belenkiy et al. |
| 5,348,240 A | 9/1994 | Carmo et al. |
| 5,359,688 A | 10/1994 | Underwood |
| 5,363,465 A | 11/1994 | Korkowski et al. |
| 5,367,598 A | 11/1994 | Devenish, III et al. |
| 5,375,185 A | 12/1994 | Hermsen et al. |
| 5,383,051 A | 1/1995 | Delrosso et al. |
| 5,402,515 A | 3/1995 | Vidacovich et al. |
| 5,408,557 A | 4/1995 | Hsu |
| RE34,955 E | 5/1995 | Anton et al. |
| 5,420,956 A | 5/1995 | Grugel et al. |
| 5,420,958 A | 5/1995 | Henson et al. |
| 5,428,705 A | 6/1995 | Hermsen et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,460,342 A | 10/1995 | Dore et al. |
| 5,473,115 A | 12/1995 | Brownlie et al. |
| 5,479,553 A | 12/1995 | Daems et al. |
| 5,490,229 A | 2/1996 | Ghandeharizadeh et al. |
| 5,497,444 A | 3/1996 | Wheeler |
| 5,515,472 A | 5/1996 | Mullaney et al. |
| 5,542,015 A | 7/1996 | Hultermans |
| 5,548,678 A | 8/1996 | Frost et al. |
| 5,553,183 A | 9/1996 | Bechamps |
| 5,553,186 A | 9/1996 | Allen |
| 5,556,060 A | 9/1996 | Bingham et al. |
| 5,559,922 A | 9/1996 | Arnett |
| 5,570,895 A | 11/1996 | McCue et al. |
| 5,590,234 A | 12/1996 | Pulido |
| 5,607,126 A | 3/1997 | Cordola et al. |
| 5,613,030 A | 3/1997 | Hoffer et al. |
| 5,617,501 A | 4/1997 | Miller et al. |
| 5,627,925 A | 5/1997 | Alferness et al. |
| 5,647,043 A | 7/1997 | Anderson et al. |
| 5,649,042 A | 7/1997 | Saito |
| 5,652,814 A | 7/1997 | Pan et al. |
| 5,659,655 A | 8/1997 | Pilatos |
| 5,689,605 A | 11/1997 | Cobb et al. |
| 5,689,607 A | 11/1997 | Vincent et al. |
| 5,692,299 A | 12/1997 | Daems et al. |
| 5,694,511 A | 12/1997 | Pimpinella et al. |
| 5,708,751 A | 1/1998 | Mattei |
| 5,717,810 A | 2/1998 | Wheeler |
| 5,724,469 A | 3/1998 | Orlando |
| 5,731,546 A | 3/1998 | Miles et al. |
| 5,734,776 A | 3/1998 | Puetz |
| 5,751,882 A | 5/1998 | Daems et al. |
| 5,758,004 A | 5/1998 | Alarcon et al. |
| 5,764,843 A | 6/1998 | Macken et al. |
| 5,774,612 A | 6/1998 | Belenkiy et al. |
| 5,775,648 A | 7/1998 | Metzger |
| 5,778,132 A | 7/1998 | Csipkes et al. |
| 5,793,920 A | 8/1998 | Wilkins et al. |
| 5,793,921 A | 8/1998 | Wilkins et al. |
| 5,796,908 A | 8/1998 | Vicory |
| 5,802,237 A | 9/1998 | Pulido |
| 5,810,461 A | 9/1998 | Ive et al. |
| 5,816,081 A | 10/1998 | Johnston |
| 5,823,646 A | 10/1998 | Arizpe et al. |
| 5,825,955 A | 10/1998 | Ernst et al. |
| 5,825,961 A | 10/1998 | Wilkins et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,867,621 A | 2/1999 | Luther et al. |
| 5,870,519 A | 2/1999 | Jenkins et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,892,877 A | 4/1999 | Meyerhoefer |
| 5,909,526 A | 6/1999 | Roth et al. |
| 5,930,425 A | 7/1999 | Abel et al. |
| 5,945,633 A | 8/1999 | Ott et al. |
| 5,956,439 A | 9/1999 | Pimpinella |
| 5,956,444 A | 9/1999 | Duda et al. |
| 5,969,294 A | 10/1999 | Eberle et al. |
| 5,975,769 A | 11/1999 | Larson et al. |
| 6,009,225 A | 12/1999 | Ray et al. |
| 6,027,252 A | 2/2000 | Erdman et al. |
| 6,044,193 A | 3/2000 | Szentesi et al. |
| 6,059,215 A | 5/2000 | Finnis |
| 6,061,492 A | 5/2000 | Strause et al. |
| 6,065,968 A | 5/2000 | Corliss |

| | | | |
|---|---|---|---|
| 6,079,881 A | 6/2000 | Roth | |
| D427,897 S | 7/2000 | Johnston et al. | |
| 6,129,221 A | 10/2000 | Shaha | |
| 6,149,315 A | 11/2000 | Stephenson | |
| 6,151,436 A | 11/2000 | Burek et al. | |
| 6,160,946 A | 12/2000 | Thompson et al. | |
| D436,027 S | 1/2001 | Johnston et al. | |
| 6,175,079 B1 | 1/2001 | Johnston et al. ............... 174/50 | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,208,796 B1 | 3/2001 | Williams Vigliaturo | |
| 6,215,938 B1 | 4/2001 | Reitmeier et al. | |
| 6,226,111 B1 | 5/2001 | Chang et al. | |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,243,526 B1 | 6/2001 | Garibay et al. | |
| 6,259,851 B1 | 7/2001 | Daoud | |
| 6,263,136 B1 | 7/2001 | Jennings et al. | |
| 6,263,141 B1 | 7/2001 | Smith | |
| 6,269,212 B1 | 7/2001 | Schiattone | |
| 6,275,640 B1 | 8/2001 | Hunsinger et al. | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| 6,289,159 B1 | 9/2001 | Van Hees et al. | |
| 6,292,614 B1 | 9/2001 | Smith et al. | |
| 6,307,997 B1 | 10/2001 | Walters et al. | |
| 6,307,998 B2 | 10/2001 | Williams | |
| 6,311,007 B1 | 10/2001 | Daoud | |
| RE37,489 E | 1/2002 | Anton et al. | |
| 6,343,313 B1 | 1/2002 | Salesky et al. | |
| 6,347,888 B1 | 2/2002 | Puetz | |
| 6,353,697 B1 | 3/2002 | Daoud | |
| 6,359,228 B1 | 3/2002 | Strause et al. | |
| 6,363,183 B1 | 3/2002 | Koh | |
| 6,363,200 B1 | 3/2002 | Thompson et al. | |
| 6,370,294 B1 | 4/2002 | Pfeiffer et al. | |
| 6,385,381 B1 | 5/2002 | Janus et al. | |
| 6,397,166 B1 | 5/2002 | Leung et al. | |
| 6,411,767 B1 | 6/2002 | Burrous et al. | |
| 6,418,262 B1 | 7/2002 | Puetz et al. | |
| 6,424,781 B1 | 7/2002 | Puetz et al. | |
| 6,424,782 B1 | 7/2002 | Ray | |
| 6,425,694 B1 | 7/2002 | Szilagyi et al. | |
| 6,427,035 B1 | 7/2002 | Mahony | |
| 6,431,762 B1 | 8/2002 | Taira et al. | |
| 6,434,313 B1 | 8/2002 | Clapp, Jr. et al. | |
| 6,434,316 B1 | 8/2002 | Grois et al. | |
| 6,438,310 B1 | 8/2002 | Lance et al. | |
| D463,253 S | 9/2002 | Canty | |
| 6,452,925 B1 | 9/2002 | Sistanizadeh et al. | |
| 6,456,772 B1 | 9/2002 | Daoud | |
| 6,464,402 B1 | 10/2002 | Andrews et al. | |
| D466,087 S | 11/2002 | Cuny et al. | |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,991 B2 | 11/2002 | Sher | |
| 6,496,640 B1 | 12/2002 | Harvey et al. | |
| 6,499,608 B1 | 12/2002 | Sterling et al. | |
| D468,996 S | 1/2003 | Sarkinen et al. | |
| 6,507,691 B1 | 1/2003 | Hunsinger et al. | |
| 6,532,332 B2 | 3/2003 | Solheid et al. | |
| 6,535,682 B1 | 3/2003 | Puetz et al. | |
| 6,539,155 B1 | 3/2003 | Broeng et al. | |
| 6,539,160 B2 | 3/2003 | Battey et al. | |
| 6,542,652 B1 | 4/2003 | Mahony | |
| 6,542,688 B1 | 4/2003 | Battey et al. | |
| 6,543,100 B1 | 4/2003 | Finley et al. | |
| 6,554,485 B1 | 4/2003 | Beatty et al. | |
| 6,556,738 B2 | 4/2003 | Pfeiffer et al. | |
| 6,556,763 B1 | 4/2003 | Puetz et al. | |
| 6,567,601 B2 | 5/2003 | Daoud et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,580,867 B2 | 6/2003 | Galaj et al. | |
| 6,581,788 B1 | 6/2003 | Winig et al. | |
| 6,591,051 B2 | 7/2003 | Solheid et al. | |
| 6,594,434 B1 | 7/2003 | Davidson et al. | |
| 6,597,670 B1 | 7/2003 | Tweedy et al. | |
| 6,598,949 B2 | 7/2003 | Frazier et al. | |
| 6,612,515 B1 | 9/2003 | Tinucci et al. | |
| 6,614,953 B2 | 9/2003 | Strasser et al. | |
| 6,614,974 B2 | 9/2003 | Elrefaie et al. | |
| 6,614,980 B1 | 9/2003 | Mahony | |
| 6,621,952 B1 | 9/2003 | Pi et al. | |
| 6,621,975 B2 | 9/2003 | Laporte et al. | |
| 6,625,374 B2 | 9/2003 | Holman et al. | |
| 6,625,375 B1 | 9/2003 | Mahony | |
| 6,631,237 B2 | 10/2003 | Knudsen et al. | |
| 6,633,717 B1 | 10/2003 | Knight et al. | |
| 6,640,028 B1 | 10/2003 | Schroll et al. | |
| RE38,311 E | 11/2003 | Wheeler | |
| 6,652,163 B2 | 11/2003 | Fajardo et al. | |
| 6,654,536 B2 | 11/2003 | Battey et al. | |
| 6,668,127 B1 | 12/2003 | Mahony | |
| 6,710,366 B1 | 3/2004 | Lee et al. | |
| 6,711,339 B2 | 3/2004 | Puetz et al. | |
| 6,715,619 B2 * | 4/2004 | Kim et al. .................. 211/26 | |
| 6,741,784 B1 | 5/2004 | Guan | |
| D491,286 S | 6/2004 | Winig et al. | |
| D491,287 S | 6/2004 | Winig et al. | |
| D491,449 S | 6/2004 | Winig et al. | |
| 6,748,155 B2 | 6/2004 | Kim et al. | |
| 6,760,531 B1 | 7/2004 | Solheid et al. | |
| 6,766,094 B2 | 7/2004 | Smith et al. | |
| D495,067 S | 8/2004 | Winig et al. | |
| 6,778,752 B2 | 8/2004 | Laporte et al. | |
| 6,792,191 B1 | 9/2004 | Clapp, Jr. et al. | |
| 6,795,633 B2 | 9/2004 | Joseph, II | |
| 6,801,695 B2 | 10/2004 | Lanier et al. | |
| 6,802,724 B1 | 10/2004 | Mahony | |
| 6,809,258 B1 | 10/2004 | Nguyen et al. | |
| D498,005 S | 11/2004 | Winig et al. | |
| 6,819,856 B2 | 11/2004 | Dagley et al. | |
| 6,819,857 B2 | 11/2004 | Douglas et al. | |
| 6,845,207 B2 | 1/2005 | Schray | |
| 6,850,685 B2 | 2/2005 | Tinucci et al. | |
| 6,865,334 B2 | 3/2005 | Cooke et al. | |
| 6,870,734 B2 | 3/2005 | Mertesdorf et al. | |
| 6,870,997 B2 | 3/2005 | Cooke et al. | |
| 6,879,545 B2 | 4/2005 | Cooke et al. | |
| 6,880,982 B2 | 4/2005 | Imamura | |
| 6,885,798 B2 | 4/2005 | Zimmel | |
| 6,920,273 B2 | 7/2005 | Knudsen | |
| 6,920,274 B2 | 7/2005 | Rapp et al. | |
| 6,925,241 B2 | 8/2005 | Bohle et al. | |
| 6,925,852 B2 | 8/2005 | Susko | |
| 6,934,451 B2 | 8/2005 | Cooke et al. | |
| 6,946,605 B2 | 9/2005 | Levesque et al. | |
| 6,968,107 B2 | 11/2005 | Belardi et al. | |
| 6,983,095 B2 | 1/2006 | Reagan et al. | |
| 6,986,608 B2 | 1/2006 | Choudhury et al. | |
| 6,993,228 B2 | 1/2006 | Burke, Jr. et al. | |
| 7,006,748 B2 | 2/2006 | Dagley et al. | |
| 7,027,695 B2 | 4/2006 | Cooke et al. | |
| 7,054,513 B2 | 5/2006 | Herz et al. | |
| 7,068,907 B2 | 6/2006 | Schray | |
| 7,083,051 B2 | 8/2006 | Smith et al. | |
| 7,110,654 B2 | 9/2006 | Dillat | |
| 7,120,347 B2 | 10/2006 | Blackwell, Jr. et al. | |
| 7,142,763 B2 | 11/2006 | Frohlich et al. | |
| 7,155,106 B2 | 12/2006 | Cianciotto et al. | |
| 7,171,121 B1 | 1/2007 | Skarica et al. | |
| 7,181,142 B1 | 2/2007 | Xu et al. | |
| 7,200,316 B2 | 4/2007 | Giraud et al. | |
| 7,200,317 B2 | 4/2007 | Reagan et al. | |
| 7,215,865 B2 | 5/2007 | Bellekens et al. | |
| 7,218,828 B2 | 5/2007 | Feustel et al. | |
| 7,245,811 B2 | 7/2007 | Takeda et al. | |
| 7,260,302 B2 | 8/2007 | Caveney | |
| 7,264,402 B2 | 9/2007 | Theuerkorn et al. | |
| 7,266,283 B2 | 9/2007 | Kline et al. | |
| 7,272,291 B2 | 9/2007 | Bayazit et al. | |

| | | |
|---|---|---|
| 7,274,852 B1 | 9/2007 | Smrha et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,349,616 B1 | 3/2008 | Castonguay et al. |
| 7,406,241 B1 | 7/2008 | Opaluch et al. |
| 7,418,184 B1 | 8/2008 | Gonzales et al. |
| 7,421,182 B2 | 9/2008 | Bayazit et al. |
| 7,450,806 B2 | 11/2008 | Bookbinder et al. |
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,522,805 B2 | 4/2009 | Smith et al. |
| 7,609,967 B2 | 10/2009 | Hochbaum et al. |
| 7,613,376 B2 | 11/2009 | Wright et al. |
| 7,766,732 B2 | 8/2010 | Hauville |
| 7,769,265 B2 | 8/2010 | Cairns |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0181896 A1 | 12/2002 | McClellan et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0123998 A1 | 7/2004 | Berglund et al. ............... 174/92 |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0100301 A1 | 5/2005 | Solheid et al. |
| 2005/0123261 A1 | 6/2005 | Bellekens et al. |
| 2005/0129379 A1 | 6/2005 | Reagan et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0133753 A1 | 6/2006 | Nelson et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0275007 A1 | 12/2006 | Livingston et al. |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1* | 2/2007 | Herzog et al. ................. 385/135 |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0104447 A1 | 5/2007 | Allen |
| 2007/0114339 A1 | 5/2007 | Winchester |
| 2007/0263962 A1 | 11/2007 | Kohda |
| 2007/0274718 A1 | 11/2007 | Bridges et al. |
| 2008/0085094 A1 | 4/2008 | Krampotich ................... 385/135 |
| 2008/0131067 A1 | 6/2008 | Ugolini et al. |
| 2008/0138026 A1 | 6/2008 | Yow et al. ...................... 385/137 |
| 2008/0145008 A1 | 6/2008 | Lewallen et al. |
| 2008/0205844 A1* | 8/2008 | Castonguay et al. ......... 385/135 |
| 2008/0259928 A1 | 10/2008 | Chen et al. |
| 2009/0060440 A1 | 3/2009 | Wright et al. |
| 2009/0097813 A1 | 4/2009 | Hill |
| 2009/0103865 A1 | 4/2009 | Del Rosso |
| 2009/0208210 A1 | 8/2009 | Trojer et al. |
| 2009/0245746 A1 | 10/2009 | Krampotich et al. |
| 2009/0263122 A1 | 10/2009 | Helkey et al. |
| 2009/0297111 A1 | 12/2009 | Reagan et al. |
| 2010/0183274 A1 | 7/2010 | Brunet et al. |

FOREIGN PATENT DOCUMENTS

| | | |
|---|---|---|
| DE | 10005294 A1 | 8/2001 |
| DE | 10238189 A1 | 2/2004 |
| DE | 202004011493 U1 | 9/2004 |
| DE | 202007012420 U1 | 10/2007 |
| EP | 0409390 A2 | 1/1991 |
| EP | 0415647 A2 | 3/1991 |
| EP | 0490644 A1 | 6/1992 |
| EP | 0541820 A1 | 5/1993 |
| EP | 0593927 A1 | 4/1994 |
| EP | 0720322 A2 | 7/1996 |
| EP | 0725468 A1 | 8/1996 |
| EP | 0828356 A2 | 3/1998 |
| EP | 0840153 A2 | 5/1998 |
| EP | 0928053 A2 | 7/1999 |
| EP | 1107031 A1 | 6/2001 |
| EP | 1120674 A1 | 8/2001 |
| EP | 1179745 A2 | 2/2002 |
| EP | 1203974 A2 | 5/2002 |
| EP | 1316829 A2 | 6/2003 |
| EP | 1944635 A2 | 7/2008 |
| EP | 1944886 A1 | 7/2008 |
| FR | 2748576 A1 | 11/1997 |
| GB | 2254163 A | 9/1992 |
| JP | 59107317 A | 6/1984 |
| JP | 6227312 A | 8/1994 |
| JP | 11125722 A | 5/1999 |
| JP | 11231163 A | 8/1999 |
| JP | 2001116968 A | 4/2001 |
| JP | 2004061713 A | 2/2004 |
| WO | 8805925 A1 | 8/1988 |
| WO | 8905989 A1 | 6/1989 |
| WO | 9507484 A1 | 3/1995 |
| WO | 9630791 A1 | 10/1996 |
| WO | 9725642 A1 | 7/1997 |
| WO | 9736197 A1 | 10/1997 |
| WO | 0221186 A2 | 3/2002 |
| WO | 02099528 A1 | 12/2002 |
| WO | 03009527 A2 | 1/2003 |
| WO | 03093889 A1 | 11/2003 |
| WO | 2004086112 A1 | 10/2004 |

| | | | |
|---|---|---|---|
| WO | 2005050277 A2 | 6/2005 | |
| WO | 2005088373 A1 | 9/2005 | |
| WO | 2006050505 A1 | 5/2006 | |
| WO | 2006127457 A1 | 11/2006 | |
| WO | 2006135524 A3 | 12/2006 | |
| WO | 2007050515 A1 | 5/2007 | |
| WO | 2007129953 A1 | 11/2007 | |
| WO | 2008033997 A1 | 3/2008 | |
| WO | 2008048935 A2 | 4/2008 | |

OTHER PUBLICATIONS

Non-final Office Action for U.S. Appl. No. 11/595,723 mailed Jun. 21, 2010, 9 pages.

Non-final Office Action for U.S. Appl. No. 11/595,723 mailed Jan. 5, 2010 9 pages.

Advisory Action for U.S. Appl. No. 11/595,723 mailed Nov. 24, 2009, 3 pages.

Final Office Action for U.S. Appl. No. 11/595,723 mailed Jul. 8, 2009, 13 pages.

Non-final Office Action for U.S. Appl. No. 11/595,723 mailed Sep. 25, 2008, 13 pages.

Final Office Action for U.S. Appl. No. 11/595,723 mailed Apr. 11, 2008, 12 pages.

Non-final Office Action for U.S. Appl. No. 11/595,723 mailed Jun. 7, 2007 18 pages.

Examiner's Answer to Appeal Brief for U.S. Appl. No. 10/804,958 mailed Apr. 29, 2010, 12 pages.

Non-final Office Action for U.S. Appl. No. 10/804,958 mailed Jul. 22, 2009, 8 pages.

Final Office Action for U.S. Appl. No. 10/804,958 mailed Jun. 11, 2008, 9 pages.

Final Office Action for U.S. Appl. No. 10/804,958 mailed Oct. 9, 2007, 8 pages.

Non-final Office Action for U.S. Appl. No. 10/804,958 mailed Jun. 15, 2007, 7 pages.

Final Office Action for U.S. Appl. No. 10/804,958 mailed Nov. 3, 2006, 7 pages.

Non-final Office Action for U.S. Appl. No. 10/804,958 mailed Apr. 6, 2006, 7 pages.

Non-final Office Action for U.S. Appl. No. 10/804,958 mailed Sep. 21, 2005, 7 pages.

Notice of Allowance for U.S. Appl. No. 11/499,572 mailed Jul. 1, 2010, 7 pages.

Advisory Action for U.S. Appl. No. 11/499,572 mailed Jan. 27, 2010, 3 pages.

Final Office Action for U.S. Appl. No. 11/499,572 mailed Aug. 12, 2009, 9 pages.

Advisory Action for U.S. Appl. No. 11/499,572 mailed May 29, 2009, 3 pages.

Final Office Action for U.S. Appl. No. 11/499,572 mailed Dec. 26, 2008, 8 pages.

Non-final Office Action for U.S. Appl. No. 11/499,572 mailed Jun. 13, 2008, 7 pages.

Notice of Allowance for U.S. Appl. No. 12/012,144 mailed Feb. 10, 2009, 6 pages.

Non-final Office Action for U.S. Appl. No. 12/012,144 mailed Jul. 15, 2008, 5 pages.

Notice of Allowance for U.S. Appl. No. 11/712,168 mailed Apr. 21, 2010, 9 pages.

Notice of Allowance for U.S. Appl. No. 11/712,168 mailed Sep. 18, 2009, 9 pages.

Notice of Allowance for U.S. Appl. No. 11/712,168 mailed Jun. 1, 2009, 7 pages.

Notice of Allowance for U.S. Appl. No. 11/712,168 mailed Apr. 7, 2009, 9 pages.

Advisory Action for U.S. Appl. No. 11/712,168 mailed Oct. 20, 2008, 3 pages.

Final Office Action for U.S. Appl. No. 11/712,168 mailed Jul. 24, 2008, 11 pages.

Non-final Office Action for U.S. Appl. No. 11/712,168 mailed Oct. 9, 2007, 7 pages.

Advisory Action for U.S. Appl. No. 11/809,390 mailed Dec. 14, 2009, 2 pages.

Final Office Action for U.S. Appl. No. 11/809,390 mailed Sep. 25, 2009, 12 pages.

Non-final Office Action for U.S. Appl. No. 11/809,390 mailed Mar. 11, 2009, 9 pages.

Notice of Allowance for U.S. Appl. No. 11/809,390 mailed Nov. 18, 2008, 7 pages.

Non-final Office Action for U.S. Appl. No. 11/809,390 mailed Jul. 25, 2008, 10 pages.

Non-final Office Action for U.S. Appl. No. 11/439,070 mailed Jun. 17, 2009, 9 pages.

Non-final Office Action for U.S. Appl. No. 11/439,070 mailed Oct. 17, 2008, 13 pages.

Non-final Office Action for U.S. Appl. No. 11/439,070 mailed Jan. 11, 2008, 11 pages.

Non-final Office Action for U.S. Appl. No. 11/439,070 mailed May 16, 2007, 16 pages.

Examiner's Answer to Appeal Brief for U.S. Appl. No. 11/975,440 mailed Oct. 22, 2010, 17 pages.

Final Office Action for U.S. Appl. No. 11/975,440 mailed Mar. 8, 2010, 10 pages.

Non-final Office Action for U.S. Appl. No. 11/975,440 mailed Oct. 28, 2009, 7 pages.

Non-final Office Action for U.S. Appl. No. 11/975,440 mailed Jul. 10, 2009, 6 pages.

Notice of Allowance for U.S. Appl. No. 12/566,191 mailed May 24, 2011, 5 pages.

Final Office Action for U.S. Appl. No. 12/566,191 mailed Feb. 15, 2011, 8 pages.

Non-Final Office Action for U.S. Appl. No. 12/566,191 mailed Sep. 30, 2010, 8 pages.

Final Office Action for U.S. Appl. No. 12/229,810 mailed Jun. 9, 2011, 16 pages.

Non-final Office Action for U.S. Appl. No. 12/229,810 mailed Dec. 23, 2010, 16 pages.

Notice of Allowance for U.S. Appl. No. 12/417,250 mailed Nov. 9, 2011, 8 pages.

Non-final Office Action for U.S. Appl. No. 12/417,250 mailed Jun. 23, 2011, 9 pages.

Final Office Action for U.S. Appl. No. 12/417,250 mailed Mar. 3, 2011, 9 pages.

Non-final Office Action for U.S. Appl. No. 12/417,250 mailed Jul. 27, 2010, 11 pages.

Advisory Action for U.S. Appl. No. 12/697,628 mailed Mar. 1, 2012, 3 pages.

Final Office Action for U.S. Appl. No. 12/697,628 mailed Nov. 17, 2011, 15 pages.

Non-final Office Action for U.S. Appl. No. 12/697,628 mailed Apr. 6, 2011, 11 pages.

Final Office Action for U.S. Appl. No. 12/630,938 mailed Jun. 1, 2012, 18 pages.

Non-final Office Action for U.S. Appl. No. 12/630,938 mailed Dec. 19, 2011, 15 pages.

Quayle Action for U.S. Appl. No. 12/861,345 mailed Apr. 9, 2012, 6 pages.

Non-final Office Action for U.S. Appl. No. 12/861,345 mailed Dec. 15, 2011, 10 pages.

Non-final Office Action for U.S. Appl. No. 12/700,837 mailed Jan. 30, 2012, 7 pages.

Final Office Action for U.S. Appl. No. 12/474,866 mailed Jan. 31, 2012, 8 pages.

Non-final Office Action for U.S. Appl. No. 12/474,866 mailed Aug. 5, 2011, 9 pages.

International Search Report for PCT/US2009/066779, mailed Aug. 27, 2010, 3 pages.

International Search Report for PCT/EP2009/000929, mailed Apr. 27, 2009, 4 pages.

Final Office Action for U.S. Appl. No. 12/700,837 mailed Aug. 31, 2012, 10 pages.

International Search Report for PCT/US2007/023631, mailed Apr. 21, 2008, 2 pages.

International Search Report for PCT/US2008/000095 mailed Sep. 12, 2008, 5 pages.

International Search Report for PCT/US2008/002514 mailed Aug. 8, 2008, 2 pages.
International Search Report for PCT/US2008/006798 mailed Oct. 1, 2008, 2 pages.
Advisory Action for U.S. Appl. No. 12/072,187 mailed Aug. 15, 2011, 2 pages.
Final Office Action for U.S. Appl. No. 12/072,187 mailed Jun. 13, 2011, 21 pages.
Non-final Office Action for U.S. Appl. No. 12/072,187 mailed Nov. 30, 2010, 17 pages.

Non-final Office Action for U.S. Appl. No. 12/892,280 mailed Nov. 6, 2012, 4 pages.
Non-final Office Action for U.S. Appl. No. 13/083,110 mailed Dec. 12, 2012, 9 pages.
Non-final Office Action for U.S. Appl. No. 13/177,233 mailed Dec. 17, 2012, 7 pages.
Monro et al., "Holey Fibers with random cladding distributions," Optic Letters, vol. 25, No. 4, Feb. 15, 2000, 3 pages.

* cited by examiner

REMOVABLY MOUNTABLE FIBER OPTIC TERMINAL

CROSS-REFERENCE TO RELATED APPLICATIONS

This application claims the benefit of priority to U.S. Provisional Patent Application No. 61/165,272 filed on Mar. 31, 2009 the contents of which are relied upon and incorporated herein by reference in their entirety.

BACKGROUND

The technology of the disclosure relates to a fiber optic terminal, and more particularly to a fiber optic terminal having a housing that is removably mountable to a cable tray, beneath a sub-floor, or to a wall to provide a zero-U installation in a data center or a central office.

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment may be located in data centers or central offices to support such interconnections.

The fiber optic equipment is typically included in housings that are mounted in equipment racks. Fiber optic cables, particularly fiber optic cables containing multiple optical fibers, route to and between the equipment racks to allow for such interconnections to the equipment mounted in the particular equipment rack. The fiber optic cables may route to and between the equipment racks in cable trays or raceways mounted overhead or in a sub-floor beneath a raised floor of the data center or central office.

However, available space in a data center or central office for equipment racks may be limited and/or very expensive. Therefore, a common problem in telecommunications systems with respect to data center and central office designs and layouts, is space management. Designing the data center and central office so as to position the necessary fiber optic equipment and/or components in a way to maximize the use of equipment rack space, while, at the same time, limiting the quantity of equipment racks is desired.

SUMMARY

Embodiments disclosed in the detailed description include a zero-U, high-density fiber optic terminal for data centers and central offices. The terminal may be used for optical fiber interconnection and/or optical fiber and fiber optic cable storage. The terminal is removably mountable to a cable tray above fiber optic equipment equipment, in a subfloor below fiber optic equipment or on a wall in proximity of fiber optic equipment. Additionally, the terminal may have an adapter panel with fiber optic adapters for optically connecting the optical fiber of a first fiber optic cable received from the cable tray and the optical fiber of a second fiber optic cable. The second fiber optic cable is intended to extend to the fiber optic equipment. The adapter panel and the fiber optic adapters are angled generally in the direction in which the second fiber optic cable is intended to extend. Angling the fiber optic adapters in this manner accommodates routing of second fiber optic cable, and provides ease of access to the fiber optic adapters for connecting and disconnecting fiber optic connectors and to slack storage components for cable management mounted in the terminal.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the embodiments. The accompanying drawings are included to provide a further understanding of the embodiments, and are incorporated into and constitute a part of this specification. The drawings illustrate various embodiments and together with the description serve to explain the principles and operation of the embodiments.

DETAILED DESCRIPTION

Reference will now be made in detail to the embodiments, examples of which are illustrated in the accompanying drawings, in which some, but not all embodiments are shown. Indeed, the embodiments may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

To optimize space management in a central office or data center, it is desirable to develop ways in which some fiber optic equipment or components may be located, positioned, and/or mounted in the data center or central office so as not to occupy any equipment rack space. Typically in such case, such equipment or component may be referred to as being "zero-U," which means that they take up zero or no units of space in the equipment rack. Further space management optimization may be accomplished by locating or mounting the zero-U equipment or components in a manner to utilize already existing structures, for example, without limitation, cable trays, walls or cable raceways in sub-floors, in the data center or central office. In this way, those existing structures may thereby be transformed into multiple-use structures.

Fiber optic cables which route to or between the equipment racks are typically routed using a cable tray or raceway. As used in this document, the term "cable tray" shall be understood to mean, without limitation, any raceway, passageway, ladder, channel, mesh, basket and/or any other structure, system or means used to support, organize, and/or distribute fiber optic cables or optical fibers between locations. The cable tray may be at least partially located above the fiber optic equipment rack in an overhead installation or orientation in the data center or central office. Additionally or alternatively, the sub-floor of the data center or central office located below the fiber optic equipment rack may be used as a cable raceway. As used herein, the term "fiber optic equipment rack" shall mean, without limitation, any structure in which or on which fiber optic equipment, components, or hardware are located and/or mounted.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

Figure 1:
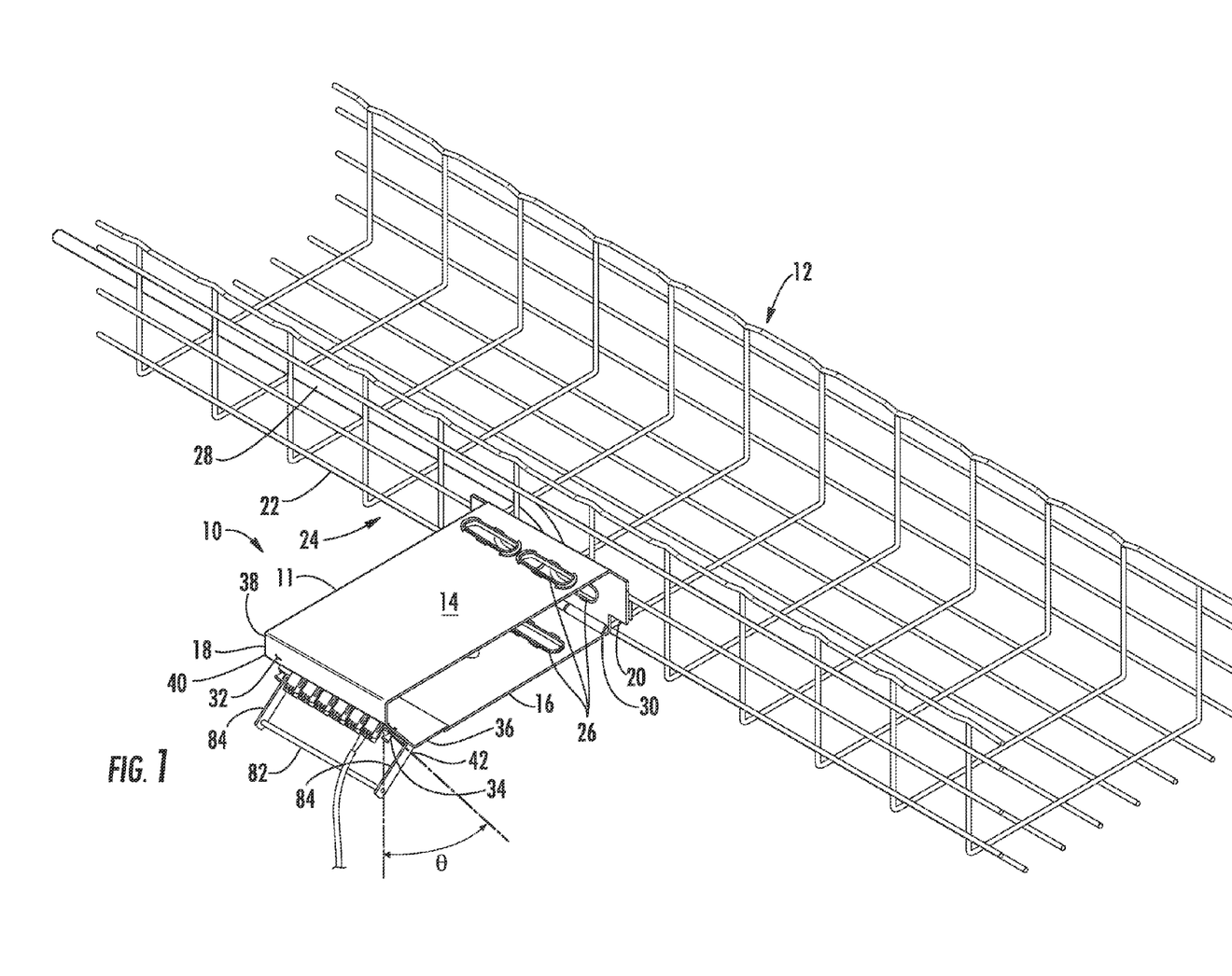
FIG. 1 is a perspective view of a fiber optic terminal housing in a closed position mounted to a side of a cable tray, according to an exemplary embodiment.
Figure 2:
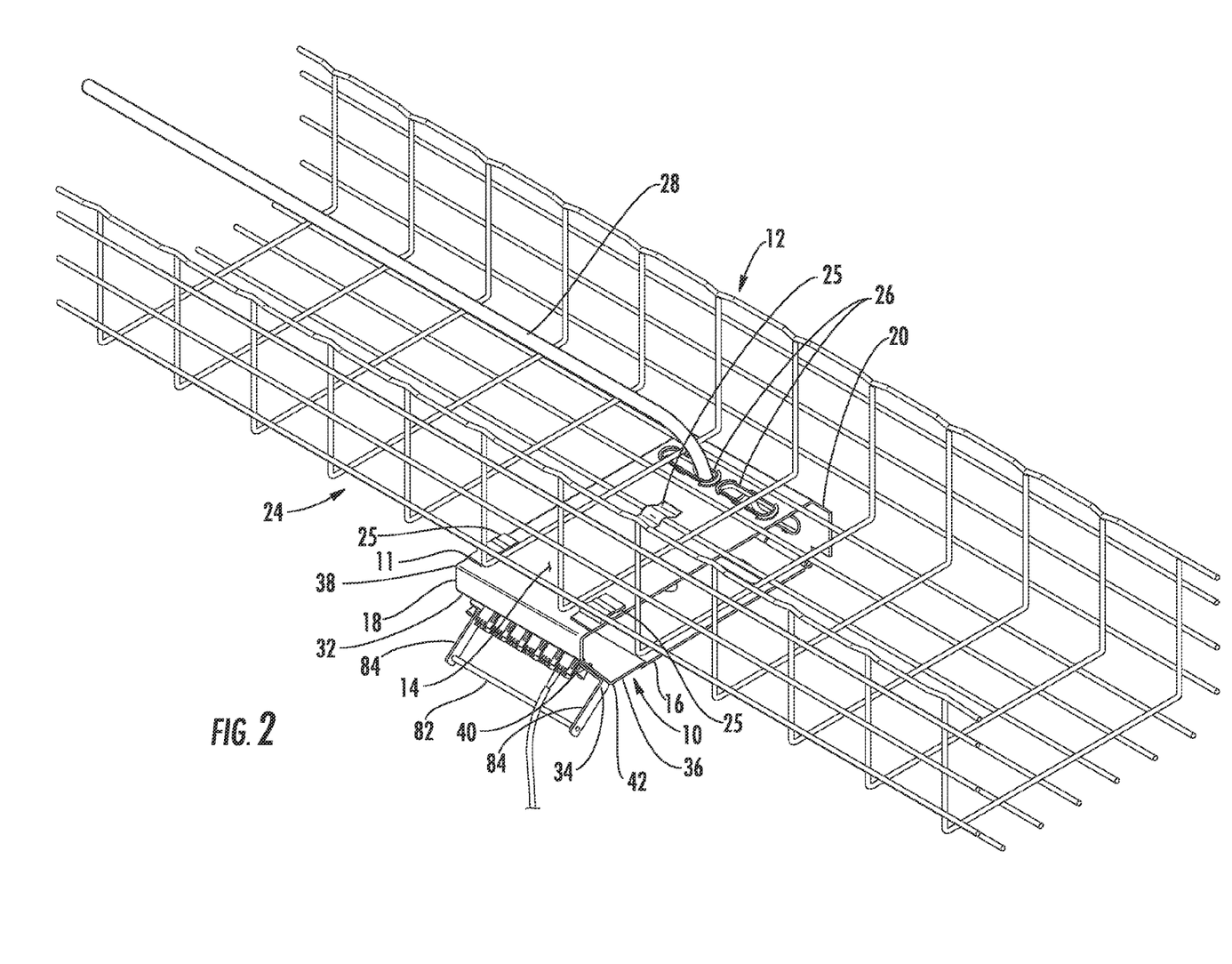
FIG. 2 is a perspective view of a fiber optic terminal housing in a closed position mounted to a bottom of a cable tray, according to an exemplary embodiment.

Referring now to FIGS. 1 and 2, there is shown a fiber optic terminal 10 having a housing 11 mounted to a cable tray 12. The housing 11 may be mounted so as to be above and/or in proximity of fiber optic equipment, including a fiber optic equipment rack, and in such a manner so not to use any space within the fiber optic equipment. In this regard, the fiber optic terminal 10 may be referred to as being zero-U mounted. The housing 11 has a top 14, a bottom 16, a front section 18, and a back side 20. In FIG. 1, the housing 11 is shown mounted to a tray side 22 of the cable tray 12 at the back side 20 of the housing 11. In FIG. 2, the housing 11 is shown mounted to a tray bottom 24 of the cable tray 12 at the top 14 of the housing 11. One or more brackets 25 may be configured to mount, which may include removably mounting, the housing 11 to the cable tray 12. The housing 11 has cable entryways 26. The cable entryways 26 may be positioned at any location on the housing 11. In FIGS. 1 and 2, cable entryways 26 are shown positioned through the top 14, the bottom 16 and the back side 20. The housing 11 is configured to receive one or more first fiber optic cables 28 via a cable entryway 26. Although in FIGS. 1 and 2 only one first fiber optic cable 28 is shown routed from the cable tray 12 and received by the housing 11, it is should be understood that any number of first fiber optic cables 28 may be received by the housing 11 through any one or more of the cable entryways 26.

Figure 4:
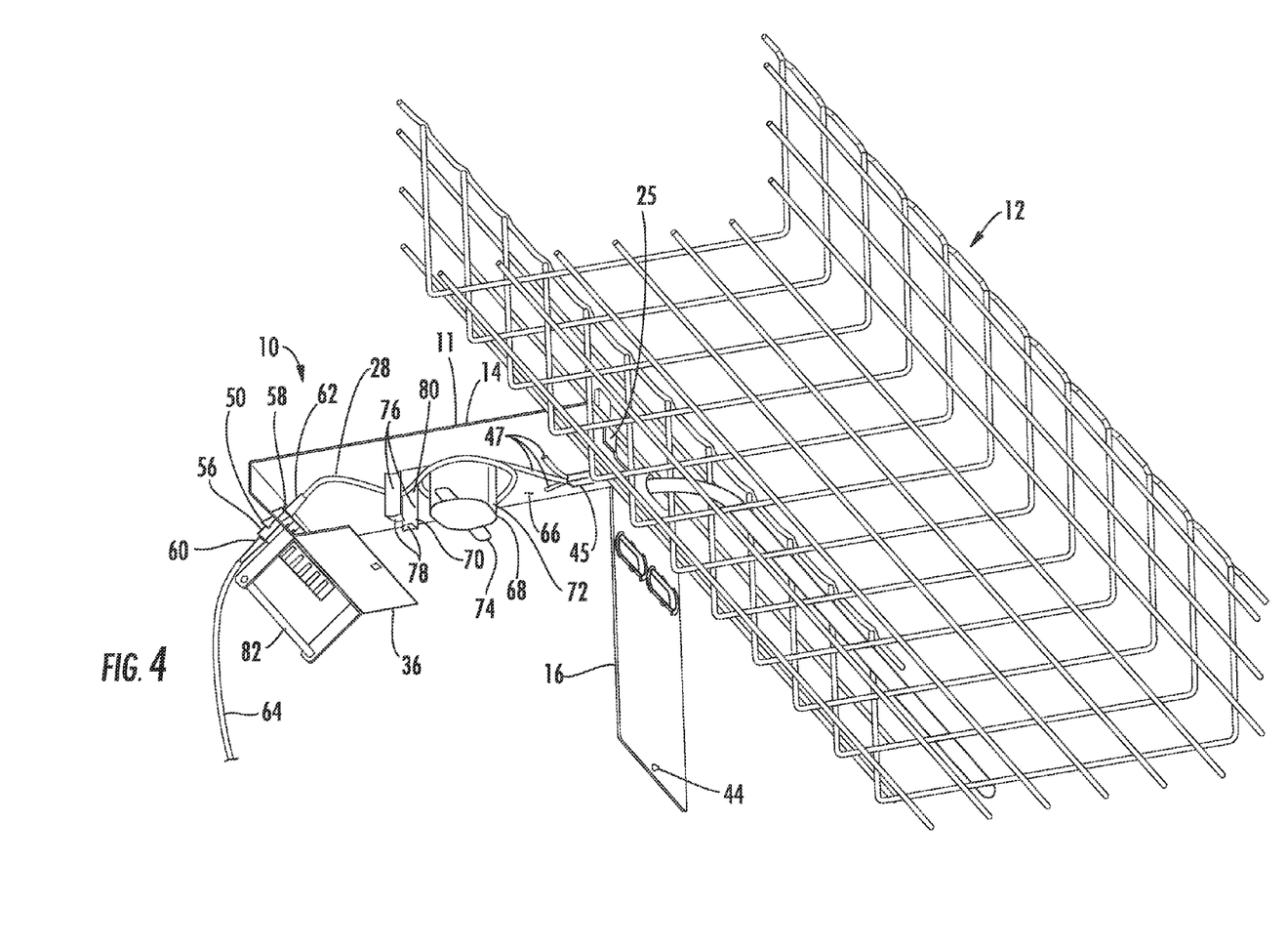
FIG. 4 is a bottom perspective view of the fiber optic terminal housing shown in FIG. 1 in the opened position.

The bottom 16 hingedly connects to the back side 20 via a hinge 30. The front section 18 includes a forward plate 32, a panel surface 34, and a latch plate 36. The forward plate 32 connects to the top 14 at top edge 38 and extends, generally vertically at a 90 degree angle therefrom. The panel surface 34 connects to the forward plate 32 at first bottom edge 40. In FIGS. 1 and 2 the panel surface 34 extends from the first bottom edge 40 at an angle θ. In this embodiment, the angle θ may be about 0 to 45 degrees, inclusive, measured from the plane of the forward plate 32. However, the angle θ may be any degree, including more than 45 degrees. The latch plate 36 connects to the panel surface 34 at second bottom edge 42 and extends generally therefrom in a plane generally aligned with a plane of the bottom 16. The bottom 16 and the latch plate 36 releasably engage using a latch mechanism 44 (as shown in FIG. 4). The latch mechanism 44 may be any suitable latching device to allow the bottom 16 to releasably engage the latch plate 36 in a closed position as shown in FIGS. 1 and 2 when so manipulated. Additionally, when desired, the latch mechanism may be manipulated to allow the bottom 16 to be disengaged from the latch plate 36 as shown in FIG. 4.

Figure 3:
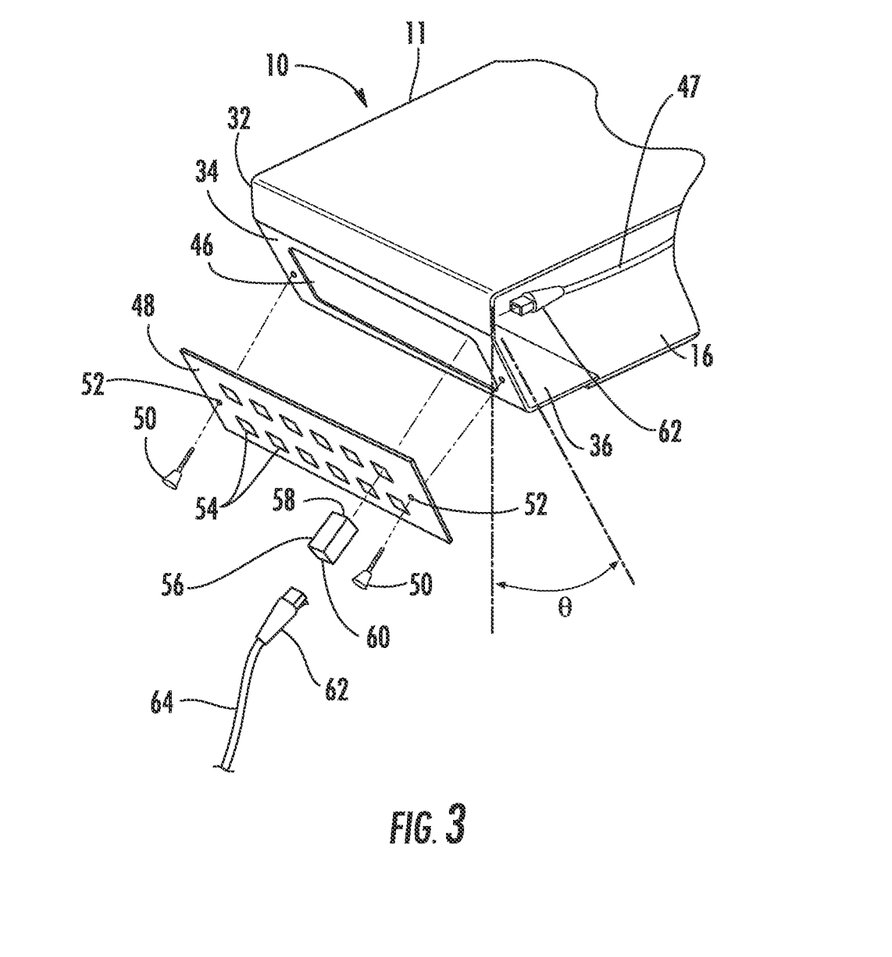
FIG. 3 is a partial exploded detail view of the fiber optic terminal housing shown in FIGS. 1 and 2.

FIGS. 3 and 4 provide more detail of fiber optic components positioned in and at the housing 11. At least one fiber optic component may be positioned in and/or on the housing 11. One such fiber optic component may be a furcation body 45 attached to an end of the first fiber optic cable 28. The furcation body 45 separates the optical fibers in the first fiber optic cable 28 into individual optical fibers 47. The panel surface 34 has a panel opening 46 at which a adapter panel 48 attaches to the panel surface 34. The adapter panel 48 removably attaches to the panel surface 34 using plungers 50 that fit plunger receptors 52 to removably secure the adapter panel 48 to the panel surface 34. The adapter panel 48 includes apertures 54 through which fiber optic adapters 56 may be inserted. The adapters 56 have a first end 58 and a second end 60. Connectors 62 installed at the ends of the optical fibers 47 of the first fiber optic cable 28 and at the end of a second fiber optic cable 64 are received by the adapters 56 at the first end 58 and the second end 60, respectively, to establish optical connectivity of the optical fibers 47 of the first fiber optic cable 28 and the optical fibers of the second fiber optic cable 64. The second fiber optic cable 64 is intended to a may extend to the fiber optic equipment. As discussed above, in the embodiments shown in FIGS. 1-4, the panel surface 34 may be angled generally toward the fiber optic equipment. Angling the panel surface 34 results in the adapter panel 48 and the adapters 56 also being angled. In this manner, the panel surface 34, the adapter panel 48 and the adapters 56 may be angled in the direction in which the second fiber optic cable is intended to be extended. The panel surface 34, the adapter panel 48 and the adapters 56 may be angled in the direction of the fiber optic equipment to which the second fiber optic cable extends or routes. Angling the adapter panel 48 and the adapters 56 in this manner accommodates routing of optical fibers to the rack, and provides ease of access to the adapters 56 for connecting and disconnecting fiber optic connectors and slack storage components for cable management. The connectors 62 may be any type of single fiber or multi-fiber connector, including, without limitation, connector types such as SC, LC, FC, ST, SC/DC, MT-RJ, MTP, MPO, or any commercially available connectors. Although only one adapter 56 is shown, it should be understood that any number of adapters 56 be included to establish optically connectivity between optical fibers in any number of first fiber optic cables 28 and second fiber optic cables 64. Additionally or alternatively, the adapter panel 48 with the adapters 56 may be part of a cassette or a module mounted in or to the housing 11.

FIG. 4 shows the housing 11 with the bottom 16 in an opened position. As described above, by manipulating the latch mechanism 44, the bottom 16 may be disengaged from the latch plate 36 and allowed to rotate to an opened position by the hinge 30. Although the hinge 30, any type of mechanism may be used that allows for the bottom 16 to rotate to an opened position and a closed position. Also in FIG. 4, the bottom 16 is shown at an angle of about 90 degrees from the plane of the latch plate 36. However, when disengaged from the latch plate 36, the bottom 16 may rotate through any angle to an opened position to allow access into the housing 11.

The top 14 has a bottom surface 66. A slack management device 68 may be mounted to the bottom surface 66 such that it extends vertically downward from the bottom surface 66.

Similarly, a routing guide 70 may be mounted to the bottom surface 66 such that it extends vertically downward from the bottom surface 66. The slack management device may be any suitable device or mechanism for managing the slack of one or more first fiber optic cables 28. In FIG. 4, the slack management device 68 is shown having a generally cylindrical body 72 and one or more tabs 74 extending radially from the cylindrical body 72. A portion of the first fiber optic cable 28 may positioned about the cylindrical body 72 to take up any slack in the first fiber optic cable 28. The tabs 74 are adapted to retain the portion of the first fiber optic cable 28 to the slack management device 68 by keeping the portion of the first fiber optic cable 28 from falling from the slack management device 68. Although only one slack management device 68 is shown in FIG. 4, any number of slack management devices 68 may be included.

The routing guide 70 may be any suitable device for routing one or more first fiber optic cable 28. In the embodiment shown in FIG. 4, the routing guide 70 has one or more projections 76 extending generally vertically downward from the bottom surface 66. In FIG. 4, two projections 76 are shown and terminated with retaining members 78. The projections 76 each have an arcuate face 80 oriented toward each other. The arcuate faces 80 allow the routing guide 70 to guide the first fiber optic cable 28 without any sharp edges that may damage the first fiber optic cable 28. The retaining members 78 retain the first fiber optic cable 28 between the projections 76 by keeping the fiber optic cable 28 from falling from the routing guide 70. The routing guide 70 also may organize the one or more first fiber optic cable 28 and/or the optical fibers of the first fiber optic cable 28, to facilitate routing of the first fiber optic cables 28 and/or the optical fibers to the appropriate adapters 50. Although only routing guide 70 is shown in FIG. 4, any number of routing guides 70 may be included. Further, although FIG. 4, illustrates a housing 11 mounted to the tray side 22, it should be understood that the description set out above with respect to FIGS. 3 and 4 also applies to a housing 11 mounted to the tray bottom 24 as is illustrated in FIG. 2.

Referring again to FIGS. 1 and 2, a strain relief bar 82 attaches to the panel surface 34 via two supports 84. As the second fiber optic cable 64 extends from the housing 11, the second fiber optic cable 64 may contact and be partially supported by the strain relief bar 82. In this manner, the strain relief bar 82 provides strain relief for the second fiber optic cable 64 as the second fiber optic cable 64 extends from the housing 11.

Figure 5:
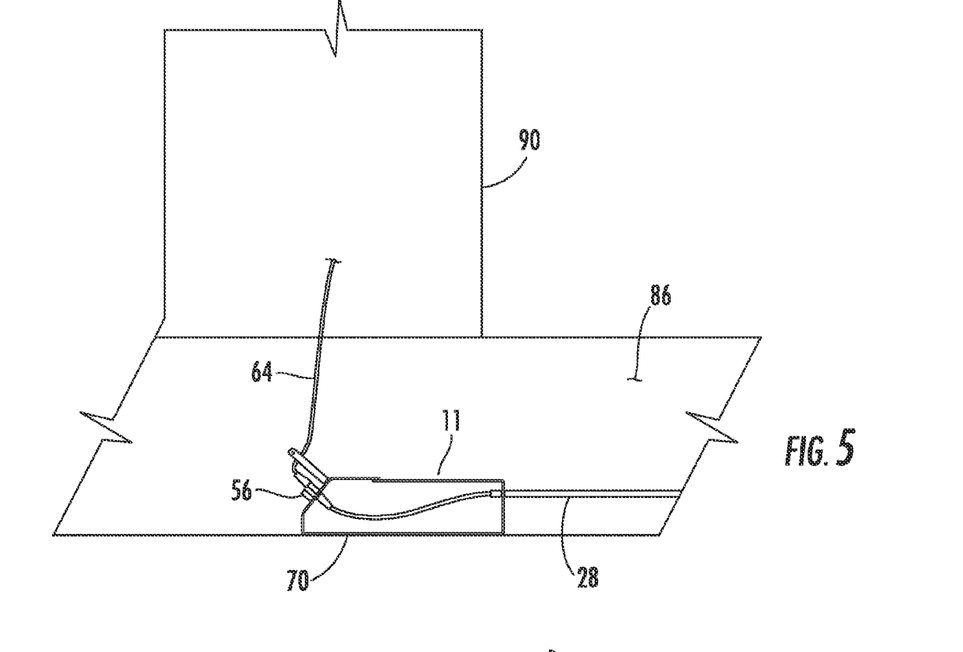
FIG. 5 is a side elevation view of a fiber optic terminal housing mounted in a subfloor beneath fiber optic equipment, according to an exemplary embodiment.
Figure 6:
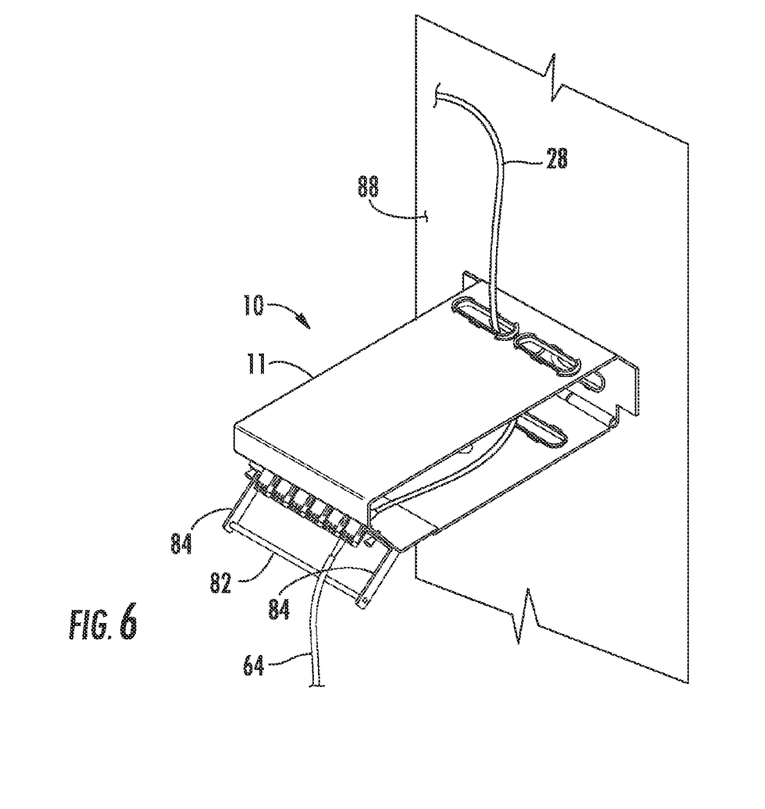
FIG. 6 is a side elevation view of a fiber optic terminal housing mounted to a wall in proximity to fiber optic equipment, according to an exemplary embodiment.

Referring now to FIGS. 5 and 6, the fiber optic terminal 10 is illustrated removably mounted in a subfloor 86 and to a wall 88, respectively. In the embodiment illustrated in FIG. 5, the fiber optic terminal 10 is mounted in the subfloor 86 beneath fiber optic equipment 90, which in this embodiment may be a rack. For purposes of clarity only, in FIGS. 5 and 6 the housing 11 is shown without the furcation body 45, the slack management device 68 and the routing guide 70. The first fiber optic cable 28 is received by and enters the housing 11. At least one optical fiber in the first fiber optic cable 28 connects to the fiber optic adapter 56 to make an optical connection with an optical fiber in the second fiber optic cable 64. The second fiber optic cable 64 extends from the housing 11 of the fiber optic terminal 10 and routes up to the fiber optic equipment 90. In the embodiment illustrated in FIG. 6, the fiber optic terminal 10 may be removably mounted to the wall 88 in proximity to the fiber optic equipment. In a similar manner to the fiber optic terminal 10 removably mounted to the tray side 22 of the cable tray 12 as described above with reference to FIG. 1, the fiber optic terminal 10 receives the first fiber optic cable 28. At least one optical fiber in the first fiber optic cable 28 connects to the fiber optic adapter 56 to make an optical connection with an optical fiber in the second fiber optic cable 64. The second fiber optic cable 64 extends from the housing 11 of the fiber optic terminal 10 and routes to the fiber optic equipment.

Many modifications and other embodiments will come to mind to one skilled in the art having the benefit of the teachings presented in the foregoing descriptions and the associated drawings. As one example, although FIGS. 1-6 illustrate a housing 11 without a left and right side, in other words, not totally enclosed. However, it should be understood that embodiments including a totally enclosed housing and any other type or design of housing are included.

Therefore, it is to be understood that the description is not to be limited to the specific embodiments disclosed and that modifications and other embodiments are intended to be included within the scope of the appended claims. It is intended that the description cover the modifications and variations provided they come within the scope of the appended claims and their equivalents. Although specific terms are employed herein, they are used in a generic and descriptive sense only and not for purposes of limitation.

What is claimed is:

1. A fiber optic terminal, comprising:
    a housing for receiving a first fiber optic cable routed in a cable tray, wherein the housing has a top, a bottom, a front section and a back side, and wherein the housing is removably mounted to the cable tray, and wherein the bottom is connected to the back side by a hinge allowing the housing to be opened and closed by rotating the bottom about the hinge;
    a fiber optic adapter for optically connecting an optical fiber of the first fiber optic cable with an optical fiber of a second fiber optic cable, and wherein the second fiber optic cable is intended to extend to fiber optic equipment, and wherein the fiber optic adapter is angled in the direction in which the second fiber optic cable is intended to extend;
    at least one of a slack management device and routing guide mounted to a bottom surface of the top such that the at least one of the slack management device and routing guide extends towards the bottom, and
    a latch plate on the front section, wherein the latch plate has a latch mechanism configured to releasably engage the bottom to the latch plate when the housing is in the closed position.

2. The fiber optic terminal of claim 1, further comprising a bracket for removably mounting the housing to the cable tray.

3. The fiber optic terminal of claim 1, wherein the fiber optic adapter comprises a plurality of fiber optic adapters.

4. The fiber optic terminal of claim 1, further comprising an adapter panel having an aperture, wherein the fiber optic adapter inserts into the aperture to attach to the adapter panel.

5. The fiber optic terminal of claim 1, further comprising a furcation body attached to an end of the first fiber optic cable, wherein the furcation body separates optical fibers in the first fiber optic cable into individual optical fibers.

6. The fiber optic terminal of claim 1, wherein the slack management device comprises a cylindrical body extending vertically from a bottom surface of the top, and wherein one or more tabs extend radially from the cylindrical body, and wherein the one or more tabs retain optical fibers of the first fiber optic cable to the slack management device.

7. The fiber optic terminal of claim 1, wherein the routing guide comprises one or more projections extending vertically from a bottom surface of the top, and wherein the one or more projections terminate with a retaining member, and wherein the routing guide facilitates routing of an optical fiber of the first fiber optic cable to the fiber optic adapter.

8. The fiber optic apparatus of claim 1, wherein the housing is removably mounted to a side of the cable tray.

9. The fiber optic apparatus of claims 1, wherein the housing is removably mounted to a bottom of the cable tray.

10. A fiber optic terminal, comprising:
- a housing for receiving a first fiber optic cable routed, wherein the housing has a top, a bottom, a front section and a back side, wherein the bottom is connected to the back side by a hinge allowing the housing to be opened and closed by rotating the bottom about the hinge;
- a latch plate on the front section, wherein the latch plate has a latch mechanism configured to releasably engage the bottom to the latch plate when the housing is in the closed position;
- at least one of a slack management device and routing guide mounted to a bottom surface of the top such that the at least one of the slack management device and routing guide extends towards the bottom and;
- a fiber optic adapter for optically connecting an optical fiber of the first fiber optic cable with an optical fiber of a second fiber optic cable, and wherein the second fiber optic cable is intended to extend to fiber optic equipment proximate the fiber optic terminal, and wherein the fiber optic adapter is angled in the direction in which the second fiber optic cable is intended to extend, and wherein the housing is adapted to be removably mountable to one of a cable tray above the fiber optic equipment, a sub-floor below the fiber optic equipment, and a wall in proximity to the fiber optic equipment.

11. The fiber optic terminal of claim 10, further comprising a furcation body attached to an end of the first fiber optic cable, wherein the furcation body separates optical fibers in the first fiber optic cable into individual optical fibers.

12. The fiber optic terminal of claim 10, wherein the slack management device comprises a cylindrical and one or more tabs extending radially from the cylindrical body, and wherein the one or more tabs retain the optical fibers of the first fiber optic cable to the slack management device.

13. The fiber optic terminal of claim 10, wherein the routing guide comprises one or more projections extending vertically from a bottom surface of the top, and wherein the one or more projections terminate with a retaining member, and wherein the routing guide facilitates routing of an optical fiber of the first fiber optic cable to the fiber optic adapter.

* * * * *